United States Patent [19]
Steinhart et al.

[11] 3,970,189
[45] July 20, 1976

[54] CONVEYOR SYSTEM FOR MANUFACTURED ARTICLES, PARTICULARLY CONFECTIONS

[75] Inventors: Gilbert Steinhart, Hannover; Heinrich Bock, Ronnenberg, both of Germany

[73] Assignee: Nabisco, Inc., East Hanover, N.J.

[22] Filed: Nov. 18, 1974

[21] Appl. No.: 524,624

Related U.S. Application Data

[63] Continuation-in-part of Ser. No. 308,428, Nov. 21, 1972, Pat. No. 3,854,569.

[30] Foreign Application Priority Data

Feb. 9, 1972 Germany.............................. 2206137

[52] U.S. Cl. ................................................ 198/34
[51] Int. Cl.² ........................................ B65G 47/26
[58] Field of Search ................ 198/29, 30, 34, 267, 198/282, 283

[56] References Cited
UNITED STATES PATENTS

| | | |
|---|---|---|
| 3,187,873 | 6/1965 | Wolff..................................... 198/29 |
| 3,528,537 | 9/1970 | Schultz et al. ........................ 198/34 |
| 3,854,569 | 12/1974 | Steinhart et al. ...................... 198/34 |

*Primary Examiner*—Evon C. Blunk
*Assistant Examiner*—Joseph E. Valenza
*Attorney, Agent, or Firm*—W. G. Fasse; W. W. Roberts

[57] ABSTRACT

A conveyor system for aligning objects includes three sequentially arranged conveyor belts. The first belt has a velocity $v_1$ and delivers the objects to the second belt. The second belt runs intermittently, having a mean velocity at least equal to $v_1$ and delivers the objects to the third belt. The third belt runs continuously at a velocity of at least $2v_1$. An alignment rail over the third belt is lowered to align the objects, and is periodically raised to let them pass. A periodically acting thrusting device over the third belt may be provided for urging rows of the objects closer together. A vertically movable product holder may be provided at the end of the second belt to inhibit passage of objects to the third belt except during determined intervals. A further alignment rail may be provided on the third belt after the thrusting device for realigning the objects, if necessary.

5 Claims, 5 Drawing Figures

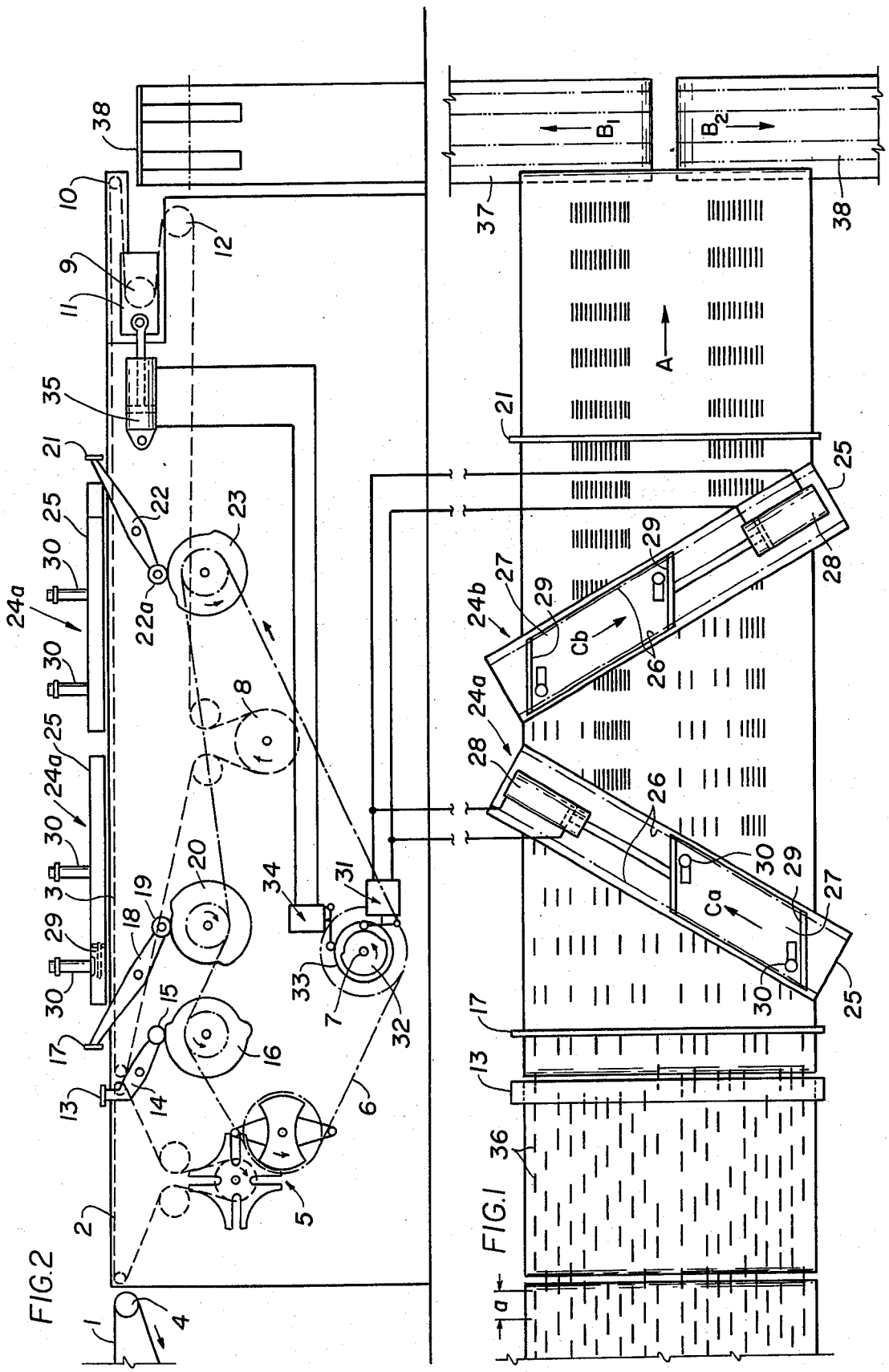

CONVEYOR SYSTEM FOR MANUFACTURED ARTICLES, PARTICULARLY CONFECTIONS

This application is a continuation-in-part application of Ser. No. 308,428 filed Nov. 21, 1972, now U.S. Pat. No. 3,854,569 granted on Dec. 17, 1974.

BACKGROUND OF THE INVENTION

This invention relates to conveyor systems for delivering small items, for example, to a counting or packing station and is particularly directed to the conveying of coated confections, which are fed from a conveyor belt at irregular spacings in approximately parallel rows in the direction of transport. It will be apparent, of course, that the invention may also be employed for the delivery of other types of goods.

The above described order of completed small items, with varying intervals, can occur in many processes, depending on the kind of product and on the preparatory process employed in preparing the goods. Consequently, a uniform, particularly mechanical, packing process, associated if necessary with a counting step, is not possible. This is also true in the processing of confections which have passed on a conveyor first through a coating machine and then through a cooling section while the confections may exhibit a certain regularity of order if they are placed by hand on the conveyor before coating, absolute accuracy of spacing in a row and crosswise alignment is not guaranteed even by hand placing. In particular, the lateral alignment of rows requires a very low delivery speed of the conveyor, or on the other hand, very fast and painfully accurate labor. Both of these solutions are uneconomical. Uniform spacing and cross row alignment is also not obtained in extensively mechanized processes, in which the articles are passed through various manufacturing stations and several conveyors.

OBJECT OF THE INVENTION

It is therefore an object of this invention to provide a conveyor system, of the above described type, which by the use of simple and economical means, rearranges small items in an orderly manner suitable for a subsequent counting and/or packing station.

SUMMARY OF THE INVENTION

Briefly stated, in accordance with the invention, a conveyor system is provided including means for rearranging small items to form lateral rows, lined up perpendicularly with respect to the direction of transport. The system includes a first feeding conveyor, an intermittently running second conveyor belt, a more rapidly running third conveyor belt, and mounted over the third belt, an alignment rail that can be raised and lowered at a determined rate.

In the system according to the invention, the intermittently running second conveyor is provided to insure that the small items are transferred to the third belt only at timed intervals. The correct choice of parameters, namely, the period and amplitude of the second conveyor and the speed of the third conveyor allows no more than one piece to be transferred at any given time from a longitudinal row to the third conveyor belt. The parameters are dependent at any given time upon the minimum spacing of pieces that can be expected in any longitudinal row. This minimum spacing is a result of the preceding manufacturing processes and conveying means. When confections pass through a chute or shaking trough in part of their preceding route, the minimum spacing results when the confections are transferred to a faster moving conveyor. The stepwise operation of the second conveyor belt and the speed of the third conveyor, in accordance with the invention, make it possible to increase the spacing of piece goods within a row so that a descending alignment rail cannot be lowered down upon the products.

The system according to the invention operates by mechanical means which are simple to manufacture and maintain. Moreover, the speeds and period of operation can be simply altered to adapt to different manufacturing processes with different spacing between pieces. The uncomplicated motion of the alignment rail in a vertical direction makes it subject, likewise, to easy control. Lateral shifting of the belt, such as can occur with long conveyors, does not adversely affect the aligning of the cross rows.

BRIEF FIGURE DESCRIPTION

In order that the invention may be clearly understood, it will now be described, by way of example, with reference to the accompanying drawings, wherein:

FIG. 1 is a schematic plan view of a conveyor system according to one embodiment of the invention;

FIG. 2 is a schematic side view of the conveyor system of FIG. 1;

DETAILED DESCRIPTION OF EXAMPLE EMBODIMENTS

Figure 3:
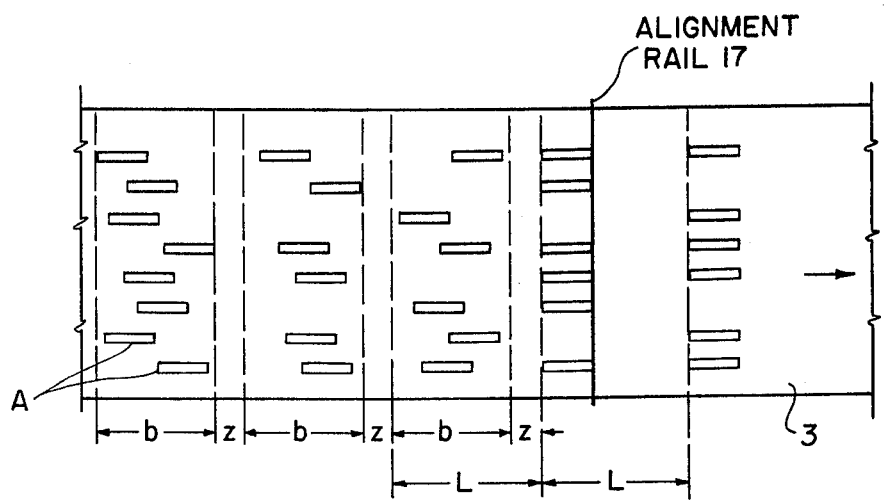
FIG. 3 is a simplified top view of articles as they may appear on the third belt in the arrangement of the invention.

Referring now to the drawings, one embodiment of a system in accordance with the invention includes a first conveyor belt 1, a second conveyor 2, and a third conveyor 3. These three belts consecutively assume the work load and move in the same transport direction indicated in FIG. 1 by an arrow A.

The drawings shown only the transfer zone of belt 1 with a guide roller 4 (FIG. 2) at this location. The belt runs continuously at a speed $v_1$. The drive and loading of goods on this belt are conventional, and are hence not illustrated to simplify the drawing.

The second belt 2 is operated rythmically preferably by means of a Geneva gear drive. In each cycle of operation the belt 2 has a running time and a rest period of equal time duration. The average speed of a whole cycle is $v_2$. The Geneva gear mechanism is rotated by a drive chain 6 from a power source 7 such as an electric motor. The length of the second belt 2 is not critical in the arrangement of the invention, and its speed is only dependent upon $v_1$ and the minimum spacing of the articles.

The third belt 3 is operated continuously by a suitable conventional drive 8 at velocity $v_3$. At the end of its work run it is led over two guide rollers 9 and 10 installed in a slide movable in and against the belt's transport direction. From slide 11 on the return run, the belt 3 passes over a fixed roller 12. Two cross conveyors 37 and 38 are positioned at the end of the work run. Arrows $B_1$ and $B_2$ indicate their travel directions.

In the transfer zone between the second and third conveyor belts, a product holder 13 is placed at the end of the belt 2 toward the belt 3, so that it extends normal to the transport direction and is suitably mounted so that it can be raised and lowered in phase with the motion of the second belt. In other words, one edge of the product holder 13 is substantially at the gap between the belts 2 and 3. This holder insures that whenever the second belt comes to rest, none of the piece goods can be seized by the third belt and moved on from the second conveyor, so that proper rows are formed with gaps between the article groups and the alignment rail 17, discussed below, is always lowered in these gaps.

The product holder 13 is vertically movable over the conveyors and is located at the region of transfer from belt 2 to belt 3. It is connected to one arm of a lever 14 whose opposite end has a roller 15 in order to provide the desired vertical movement. The roller 15 rests on a cam 16, driven by chain 6.

In the transfer from the first conveyor to the intermittently running second conveyor belt, such a product holder is not required, at least in the case of coated confections, which the first belt has transported through a coating machine and then a cooling section. The coating causes the pieces to adhere to the first belt in such a manner that they cannot move in an uncontrolled manner, especially so that they cannot experience a sideward turn when the second conveyor is motionless. Such turning could cause articles with delicate crusts to damage each other, as well as to effect a disruption of the desired longitudinal alignment.

At a position spaced from the transfer region between the second and third belts, a vertically movable alignment rail 17 is mounted over belt 3. The rail 17 may be of a yielding material. Like holder 13, rail 17 is connected to one arm of a lever 18 whose other end rests with a roller 19 on a cam 20, likewise driven by chain 6, but in the opposite direction of rotation. A second holder 21, with associated lever 22, roller 22a, and cam 23, is incorporated at a position spaced from the end of the third conveyor's working run. Chain 6 also drives cam 23, but in the opposite direction to cam 20.

Since in a preferred embodiment of the invention, the second conveyor belt, the product holder, and the alignment rail have a common actuation, construction and operation of the apparatus are economical, and control is simply attained by a positive phase coupling among the motions of these parts. The common drive preferably, although not necessarily, consists of the endless belt or chain 6.

In a further improvement of a conveyor system according to this invention, at least one laterally effective thrusting device 24a is arranged above the third conveyor belt and following the alignment rail. This device 24a allows the lateral spacing within each cross row to be changed. Articles or pieces of confectionery which pass through a coating machine for the application of chocolate or other liquid coverings exhibit, in consequence of this process, a specified, relatively large lateral spacing. This large spacing is undesirable in the following stages of transport. Action of the thrusting device moves the pieces closer together without affecting their lateral alignment. Thus, the articles require less space on a further transport means such as a further conveyor positioned at a right angle to the third conveyor, whereby said further conveyor can run more slowly. The space saving is especially significant when the width of the third belt and/or the number of rows is large. Greater manufacturing capacity, as in a coating machine, can be utilized in this way.

The thrusting device 24a can incorporate a frame 25 suitably mounted on the support of the third conveyor by means (not shown) and adapted to support at least one vertically and horizontally movable rake 29. The capability of moving up and down as well as to and fro enable the work stroke of the rake 29 to be accomplished in a lowered position on the conveyor to shift the product articles. The rake can be raised for the return stroke, during which time a new group of pieces can be delivered to the rake's effective zone. The rake is preferably mounted to move horizontally at an angle to the direction of transport. This means that, while shifting the pieces laterally, the rake simultaneously follows the longitudinal motion imparted to them by the conveyor. As a consequence there is no delay in delivery of the articles. In addition, the articles are not stressed as much which is essential with delicate products.

In the preferred embodiment as illustrated, the thrusting device 24a has two rakes 29, each covering about half of the conveyor's width. This has the advantage of reducing the length of the work and return strokes. With the same performance, an individual rake can be made shorter to handle less material at a time. In addition, single articles are shifted a shorter distance, and only half of the articles arriving in a cross row are shifted at a time. This contributes to careful handling.

A preferred embodiment of the invention as illustrated includes two thrusting devices 24a and 24b. These devices extend at such angles to the direction A of transport that the angle between thrusting devices is approximately bisected by a line perpendicular to the travel direction. The thrusting devices have the same construction, but are arranged so that their working strokes Ca and Cb are oppositely directed relative to the sides of the conveyor 3. Device 24b has such a placement, consequently, that corresponds to a rotation of at least 270° from the orientation of device 24a in their horizontal plane. The devices 24a and 24b are preferably at approximately a 45° angle to the direction of transport in the horizontal plane and at a right angle to each other, with oppositely directed work strokes. This scheme allows a further shortening of stroke to about a quarter of the conveyor width. One thrusting device pushes half the pieces in one direction, the other the rest in the opposite direction from those already shifted together. If each thrusting device operates with only one rake, the result is a group of closely spaced pieces in the center of the conveyor. With two rakes in each thrusting device, there will be two separate ranks of articles in close proximity. Since even fewer articles are shifted together with each work stroke in this manner, careful handling is enhanced.

In order to movably support the gates, each frame 25 preferably holds two guides 26, indicated only by their center lines, on which a support plate 27 can be moved in the direction of arrow Ca and Cb respectively, and back by means of cylinder 28. Each plate 27 carries two spaced apart rakes 29. Each plate is connected to a separate vertically operating force cylinder 30. Cylinder 28 of both thrusting devices as well as the coupled cylinders 30 are operably connected by suitable lines (not shown) to the output of control system 31. The control system is coupled to a cam 32 mounted on the shaft of the power source 7 for chain 6. A cam 33 on the same shaft is coupled to operate control system 34 which determines the movement of slide 11 by means of cylinder 35.

The above described system according to one embodiment of the invention operates as follows. The system of FIGS. 1 and 2 is specifically designed for the delivery of confection articles indicated by short lines 36 which come from a cooling installation after being coated with liquid chocolate. A stick shape is indicated. The pieces or articles are carried from a cooler on the first belt 1 at a constant speed $v_1$ and are arranged in longitudinal columns with roughly equal lateral spacing. However, the spacing of pieces in the direction of transport is irregular, and the spacing of each column from the other columns is greater than desired. It is only possible to achieve a definite minimum distance $a$ between the leading edges of two pieces following each other in the same columns. This minimum distance is a result of the handling of the pieces during the earlier portion of transport, when the products pass from a vibrating chute (not shown) to the faster moving first conveyor belt 1.

The second belt 2 has a stepwise motion with a frequency $F$, corresponding to $F = (v_1/a)$, where $a$ is the above mentioned minimum distance between the leading edges of two adjacent pieces in the same column on belt 1. This frequency assures that during each cycle no more than one piece of confectionery 36 per column is transferred from the first belt 1 to the second belt 2. The mean velocity $v_2$ of the second belt is at least equal to the velocity $v_1$ of the first belt, that is, during its movement the second belt reaches a velocity that is at least about double that of the first belt. It is noted that the touching of articles in a column is prevented if the spacing $a$ is at least twice as large as the article length.

During the time of each cycle, no more than one article per column moves on to the third conveyor, whose constant speed $v_3$ is at least double the speed $v_1$, so that the spacing between articles in a column is at least equal to the lengths of the articles. The product holder 13 which rises to permit passage of pieces thereunder when the second belt is moving and falls to prevent passage of articles when the second belt stops, prevents articles arriving at the end of the work run of the second belt or overlapping onto the third belt at the time the second belt stops from being taken by the third belt. The first alignment rail 17 is brought down upon the third belt by its cam 20, driven in synchronization with the stepwise motion of belt 2 by the Geneva gear mechanism 5. It halts the oncoming group of pieces with at most one article from each longitudinal columns until all of the groups have arrived. The alignment rail 17 is then raised for a brief time so that the articles now aligned laterally in a row can pass under the rail. Then the rail 17 descends again.

Figure 4:
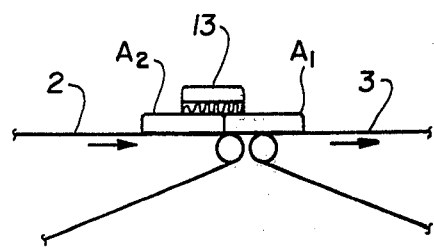
FIG. 4 is a side view of a portion of the arrangement of FIG. 1, showing articles on the belts.
Figure 5:
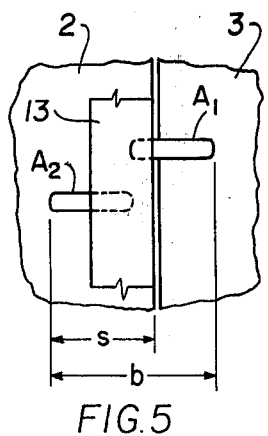
FIG. 5 is a partial top view of FIG. 4.

The fact that the arrangement of the present invention assures the provision of a spacing between the groups of articles will now be explained with reference to FIGS. 3 to 5.

If the minimum spacing $a$ between two articles following each other in a column on the belt 1 is maintained and if the belt 1 moves at the speed $v_1$ then the maximum number of articles transported per minute is $x = v_1/a$. If the stepping frequency $F$ of the belt 2 is equal to or larger than $x$, it is assured that during one step one article at the most for each column is transferred onto the belt 2 and thus also onto the belt 3. The length of the belt 2 is thereby of on consequence. The stepping frequency is thus only dependent on $v_1$ and $a$ to form sets of articles on belt 2.

For each step of the intermittently driven belt 2, several articles 36, one for each columns will be transferred onto the belt 3. These articles will be formed into sets with a length $b$, see FIG. 3, which illustrates in simplified form articles on the belts 2 and 3, the belts moving in the direction of the arrow. From FIGS. 4 to 5, which illustrate articles in the region of the gap between belts 2 and 3, it may be seen that for a step length $s$, the articles $A_1$, which have partially moved onto belt 3, as well as the articles $A_2$, which have not reached belt 3 are transferred onto the belt 3, as belt 2 completes a step. The articles $A_1$ and $A_2$ will be held down by the product holder 13.

If, between the sets of articles on belt 2 there is always a sufficiently large intermediate space $z$, as shown in FIG. 3, it is possible to produce exact rows of the articles by means of the alignment rail 17, and the danger of the alignment rail descending on articles will be obviated. Further, the spacing of the alignment rail 17 is also immaterial, it only being necessary that its movement is synchronized properly with the operation of the intermittent belt 2.

As discussed above, the following criteria are established in the present claimed invention:

$$v_1 = a \cdot x$$

$$v_2 \geq v_1, v_2 = F \cdot S$$

$$v_3 \geq 2 \cdot v_1$$

$a$ = minimum spacing of the articles on belt 1
$x$ = maximum number of articles per column and minute
$F$ = stepping frequency of belt 2
$S$ = length of step of belt 2
$v_2$ = mean or average speed of the belt 2
$C$ = length of the article Upstream of the alignment rail 17, the sets of articles have a spacing defined as $L = b + z$, as is apparent from FIG. 3. It therefore follows that $v_3 = L \cdot F$. In order to show that the spacing $z$ between groups exists, and is definable, in accordance with the invention, an actual embodiment of the invention will now be given. Assume that the article length $c$ is 45 mm, and that the minimum spacing $a$ is 68 mm. Further assume that $v_3 = 2 \cdot v_1$, $v_2 = 1.1 \cdot v_1$, and that $a = S$. From FIGS. 4 to 5

$$b = S + c$$

$$b = a + c = 68 + 45 = 113 \text{ mm}$$

$$v_3 = L \cdot F$$

$$L = b + z$$

$$b = a + c$$

The latter expression follows from the fact that the speed of belt 3 is substantially the same as that of belt 2 when it is moving. Then:

$$L = a + c + z$$

$$v_3 = (a + c + z) F$$

$$v_2 = F \cdot S, F = v_2/S, v_2 = 1.1 \cdot v_1$$

$$v_3 = (a + c + z) 1.1 \cdot v_1/a, v_3 = 2 \cdot v_1$$

$$a + c + z = 2a/1.1$$

$$z = 2a/1.1 - (a+c)$$

$$z = 2 \cdot 68/1.1 - (68 + 45)$$

$$z = 123.5 - 113 = 10.5 \text{ mm}$$

It is therefore apparent in the arrangement disclosed by the invention, that the spacing z does exist in the arrangement in accordance with the invention and is a determinable length that readily enables the controlling operation of the alignment rail 17 to insure the alignment of the groups without danger of bumping of the articles. There is no danger of bumping or collision of the articles on the last conveyor, since there is only one article in each column of articles, and further since the spacing between the groups is insured. This effect is obtained by arranging the product holder 13 at the end of the belt 2. An article, which at the end of the step is still partially on the belt 2 will be securely held by the product holder 13. The possibilty of lowering the rail 17 on an article does not occur in the arrangement of the present invention due to the assurance of the spacing z. Consequently, the formation of exact rows of articles is assured in the arrangement of the invention.

In order to prevent turning of articles moving onto belt 3, the speed $v_3$ of this belt should be at least equal to the maximum speed of belt 2. The arrangement in accordance with the present invention, thus, does not require the use of alignment fingers for the articles, thereby enabling the use of the invention in the alignment of "sticky" articles which are not readily alignable with such fingers.

As can be seen from FIG. 1, the laterally aligned articles or pieces now move into the zone of the lateral thrusting device 24a. This device executes a work stroke, cyclically actuated by control system 31, in the direction of arrow Ca with rakes 29 down tight against belt 3. In this way, each rake 29 at a time pushes about a quarter of a row of pieces closely together. The speed of the work stroke is set so that its component in the transport direction matches the belt velocity $v_3$. The back stroke follows with the retraction of cylinder 28. At the same time, cylinders 30 are actuated in the vertical direction to lift rakes 29 so that they move back over the pieces and do not disturb them. Thrusting device 24b works in the same manner to shift the two quarter rows not previously shifted in the opposite direction, so that the pieces on the third belt are now arranged in two laterally aligned groups of closely spaced pieces. Rows are realigned by the second alignment rail 21, which acts in the same way as 17, in case any irregularity develops from the action of the thrusting devices. Slide 11 controlled by cam 33 moves periodically to and fro, so that the end of the working surface of belt 3 alternately extends over lateral belts 37 and 38 and, without change of speed, is drawn back. Consequently, two lateral rows of the product fall at intervals upon the lateral belts 37 and 38 which feed the pieces to a counting and/or packing station.

The invention is not intended to be restricted to the above described specific example. The relationship of the various delivery speeds, step periods, and physical spacings is variable according to the product to be delivered. In the same way, one or both of the thrusting devices can be omitted, or both can work in the same direction, if necessary, depending upon the intended order of pieces as determined by the manufacturing process. The common drive and common control for movement of the second belt, the product holder, and the alignment rails can be effected by other means, for example, by electric control although this would involve a considerably greater expense in fabricating the apparatus.

It will be noted that application of the delivery system is not limited to confectionery products. Other articles which are delivered in similar order or disorder and which must be arranged in uniform groups or rows for counting and/or packing can be conveyed through a conveyor system of this kind without departing from the invention.

Although the invention has been described with reference to specific example embodiments, it is to be understood, that is in intended to cover all modifications and equivalents within the scope of the appended claims.

What is claimed is:

1. In a method for operating a conveyor system of the type having a first conveyor belt movable at a velocity $v_1$ and adapted to transport irregularly spaced articles, wherein means for aligning said articles include a second conveyor belt positioned to receive directly said articles from said first belt, and a third belt positioned for receiving articles from said second belt, as well as alignment rail means positioned above said third belt, and article holding means positioned above said second belt to extend transversely to the direction of movement of said belts, the steps comprising intermittently operating said second belt at a stepping frequency $F = (v_1/a)$ in steps per minute and an average velocity $v_2 \geq v_1$ with equal duration periods of running time and rest, whereby $v_{2run}$ is at least equal to $2v_1$, wherein $v_1$ is the velocity of the first belt, wherein $a$ is the minimum longitudinal spacing between the leading edges of the two successive articles on the first belt, and wherein the length of each step of the second belt corresponds to $a$, continuously running said third belt at a velocity $v_3 \geq 2v_1$, periodically moving said alignment rail means to a first position to inhibit movement of said articles on said third belt and moving said rail means to a second position to permit movement of said articles on said third conveyor belt, positioning said article holding means at the end of said second belt toward said third belt, and raising and lowering said article holding means in synchronism with the intermittent movement of said second belt, said frequency $F = (v_1/a)$ assuring that said alignment rail will be positioned between successive articles.

2. The method of claim 1, further comprising deriving the power for said intermittently operating of said second belt, and for said periodically moving said rail means, as well as for said raising and lowering of said article holding means from a common source of power.

3. The method of claim 1, further comprising intermittently operating said second belt by means of a Geneva gear drive.

4. The method of claim 1, comprising selecting the average velocity $v_2$ of the intermittently operated second belt to be at least equal to the maximum velocity $v_1$ of said first conveyor belt.

5. The method of claim 1, comprising positioning said article holding means so as to overlap the tail end of a preceding article ($A_1$) and the leading end of a following article ($A_2$) at the interface between the second and third belt.

* * * * *